(12) United States Patent
Yamada et al.

(10) Patent No.: US 9,776,666 B2
(45) Date of Patent: Oct. 3, 2017

(54) VEHICLE SIDE SECTION STRUCTURE

(71) Applicants: TOYOTA JIDOSHA KABUSHIKI KAISHA, Toyota-shi (JP); IIDA INDUSTRY CO., LTD., Inazawa-shi (JP)

(72) Inventors: Kenjiro Yamada, Toyota (JP); Kenji Takada, Ama (JP)

(73) Assignees: TOYOTA JIDOSHA KABUSHIKI KAISHA, Toyota-shi (JP); IIDA INDUSTRY CO., LTD., Inazawa-shi (JP)

(*) Notice: Subject to any disclaimer, the term of this patent is extended or adjusted under 35 U.S.C. 154(b) by 0 days.

(21) Appl. No.: 15/193,900

(22) Filed: Jun. 27, 2016

(65) Prior Publication Data

US 2017/0036701 A1 Feb. 9, 2017

(30) Foreign Application Priority Data

Aug. 5, 2015 (JP) .................................. 2015-155338

(51) Int. Cl.
  *B62D 21/15* (2006.01)
  *B62D 25/04* (2006.01)
  *B62D 29/00* (2006.01)

(52) U.S. Cl.
  CPC ........... *B62D 21/157* (2013.01); *B62D 25/04* (2013.01); *B62D 29/002* (2013.01)

(58) Field of Classification Search
  CPC .............................. B62D 21/157; B62D 25/04
  USPC .................. 296/193.06, 30, 187.13
  See application file for complete search history.

(56) References Cited

U.S. PATENT DOCUMENTS

| | | | |
|---|---|---|---|
| 6,896,320 B2* | 5/2005 | Kropfeld | B62D 29/002 296/146.6 |
| 6,928,736 B2* | 8/2005 | Czaplicki | B62D 25/04 29/458 |
| 2001/0042353 A1* | 11/2001 | Honda | B29C 44/1228 296/146.6 |

(Continued)

FOREIGN PATENT DOCUMENTS

| | | |
|---|---|---|
| JP | 3525890 | 5/2004 |
| JP | 2009-120161 | 6/2009 |

(Continued)

*Primary Examiner* — Jason S Morrow
*Assistant Examiner* — E Turner Hicks
(74) *Attorney, Agent, or Firm* — Oblon, McClelland, Maier & Neustadt, L.L.P.

(57) ABSTRACT

A vehicle side section structure including: a center pillar including an outer panel, an inner panel that forms a closed cross-section with the outer panel, and a reinforcement member that is provided inside the closed cross-section, that reinforces the outer panel, and that includes a main body section including a front wall, a side wall, and a rear wall and open toward the vehicle width direction inside, and a recessed portion formed between a front side ridgeline formed by the front wall and the side wall and a rear side ridgeline formed by the side wall and the rear wall and open toward the vehicle width direction outside; and filler material filled between the recessed portion and a facing face that faces the recessed portion, excluding at the periphery of the front side ridgeline and at the periphery of the rear side ridgeline of the main body section.

6 Claims, 7 Drawing Sheets

(56) References Cited

U.S. PATENT DOCUMENTS

| | | | | |
|---|---|---|---|---|
| 2002/0053179 A1* | 5/2002 | Wycech | ................ | B29C 44/18 |
| | | | | 52/834 |
| 2003/0030297 A1* | 2/2003 | Tohda | .................. | B60R 21/13 |
| | | | | 296/96.12 |
| 2013/0133771 A1* | 5/2013 | Richardson | .............. | F16L 9/00 |
| | | | | 138/109 |

FOREIGN PATENT DOCUMENTS

| JP | 2013-060044 | 4/2013 |
|---|---|---|
| JP | 2014-189111 | 10/2014 |

* cited by examiner

VEHICLE SIDE SECTION STRUCTURE

CROSS-REFERENCE TO RELATED APPLICATION

This application is based on and claims priority under 35 USC 119 from Japanese Patent Application No. 2015-155338 filed on Aug. 5, 2015, the disclosure of which is incorporated by reference herein.

BACKGROUND

Technical Field

The present invention relates to a vehicle side section structure.

Related Art

Japanese Patent No. 3525890 describes a center pillar in which a closed cross-section is formed by an outer panel and an inner panel, reinforcement with a hat shaped cross-section is provided between the outer panel and the inner panel, and foamed filler material is filled between the outer panel and the reinforcement. Viewed in the vehicle up-down direction, the foamed filler material is filled at the vehicle width direction outside of a ridgeline of the reinforcement.

However, in the case of the prior art of Japanese Patent No. 3525890 described above, since the filler material is filled at the vehicle width direction outside of the ridgeline of the reinforcement, the ridgeline of the reinforcement is disposed further toward the vehicle width direction inside than in configurations that do not include the filler material. The cross-section height of a lateral cross-section formed by the inner panel and the reinforcement is thereby shortened due to the ridgeline being disposed further toward the vehicle width direction inside. There is accordingly is a possibility that the moment (of resistance) at which the ridgeline buckles in a side-impact collision (hereinafter referred to as "in a side-on collision") is reduced and strength is decreased. In other words, there is room to improve the strength of the center pillar in configurations in which filler material is employed in the center pillar.

SUMMARY

In consideration of the above circumstances, an object of the present invention is to obtain a vehicle side section structure capable of improving the strength of a center pillar in configurations in which filler material is employed in the center pillar.

A vehicle side section structure according to a first aspect of the present invention includes: a center pillar configured including an outer panel that is open toward a vehicle width direction inside, an inner panel that is disposed further toward the vehicle width direction inside than the outer panel and forms a closed cross-section with the outer panel, and a reinforcement member that is provided inside the closed cross-section, that reinforces the outer panel, and that includes a main body section including a front wall, a side wall, and a rear wall and open toward the vehicle width direction inside, and a recessed portion formed between a front side ridgeline formed by the front wall and the side wall and a rear side ridgeline formed by the side wall and the rear wall and open toward the vehicle width direction outside; and filler material that is filled between the recessed portion and a facing face that faces the recessed portion, excluding at the periphery of the front side ridgeline and at the periphery of the rear side ridgeline of the main body section.

In the vehicle side section structure according to the first aspect of the present invention, the recessed portion is formed in the main body section of the reinforcement member, increasing the strength of the reinforcement member. In this vehicle side section structure, in a side-on collision of the vehicle, load toward the vehicle width direction inside acts on the center pillar such that the outer panel enters a compressed state and the inner panel enters in a stretched state.

The filler material is filled between the recessed portion and the facing face that faces the recessed portion, excluding at the periphery of the front side ridgeline and at the periphery of the rear side ridgeline. This enables the front side ridgeline and the rear side ridgeline to be disposed further toward the vehicle width direction outside than in configurations in which the filler material is filled at the periphery of the front side ridgeline and the periphery of the rear side ridgeline. This enables the cross-section height of the closed cross-section formed by the inner panel and the reinforcement member to be taller, thereby enabling the moment (of resistance) at which the front side ridgeline and rear side ridgeline of the reinforcement member buckle to be increased, and the strength of the center pillar to be improved. Namely, configurations in which the filler material is employed in the center pillar enable the strength of the center pillar to be improved.

In a vehicle side section structure according to a second aspect of the present invention, the filler material is filled between the outer panel serving as the facing face and the recessed portion.

In the vehicle side section structure according to the second aspect of the present invention, load acting on the outer panel in a side-on collision is transmitted to the reinforcement member through the filler material that is in contact with the outer panel, and is borne by the reinforcement member. Thus, the load borne by the outer panel is reduced, thereby enabling deformation of the outer panel to be suppressed.

In a vehicle side section structure according to a third aspect of the present invention, a supplementary reinforcement member that reinforces the reinforcement member is provided to the reinforcement member, and the filler material is filled between the supplementary reinforcement member serving as the facing face and the recessed portion.

In the vehicle side section structure according to the third aspect of the present invention, load is transmitted from the outer panel to the reinforcement member due to contact between the outer panel and the reinforcement member in a side-on collision. Load transmitted to the reinforcement member is borne by the reinforcement member and is also transmitted to the supplementary reinforcement member through the filler material, and is borne by the supplementary reinforcement member. The load is accordingly borne by the reinforcement member and the supplementary reinforcement member, thereby enabling deformation of the center pillar to be suppressed.

In a vehicle side section structure according to a fourth aspect of the present invention, vehicle up-down direction upper end portions of the outer panel, the inner panel, and the reinforcement member are joined to a roof side rail, the recessed portion extends from a vehicle belt line to the roof side rail, and the filler material is filled in the recessed portion from the belt line to the roof side rail.

In the vehicle side section structure according to the fourth aspect of the present invention, part of the load that has acted on the outer panel in a side-on collision is transmitted to the reinforcement member through the filler material at the vehicle belt line, and is borne by the reinforcement member. The remaining load acting on the outer panel in a side-on collision is transmitted from the belt line to the roof side rail through the filler material. Thus the load that has acted the outer panel in a side-on collision is distributed to, and borne by, the reinforcement member and the roof side rail, and is suppressed from localized concentration at a portion of the reinforcement member, thereby enabling deformation of the reinforcement member to be suppressed.

A location of the center pillar further toward the upper side than the belt line generally has a smaller closed cross-section area than a location of the center pillar further toward the lower side than the belt line. The filler material is filled in at the location with the smaller closed cross-section area, thereby enabling deformation of the reinforcement member and the center pillar to be suppressed.

As explained above, the vehicle side section structure of the first aspect of the present invention has an excellent advantageous effect of enabling the strength of the center pillar to be improved in configurations in which filler material is employed in the center pillar.

The vehicle side section structure of the second aspect of the present invention has an excellent advantageous effect of enabling deformation of the outer panel to be suppressed.

The vehicle side section structure of the third aspect of the present invention has an excellent advantageous effect of enabling deformation of the center pillar to be suppressed.

The vehicle side section structure of the fourth aspect of the present invention has an excellent advantageous effect of enabling deformation of the reinforcement member to be suppressed.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
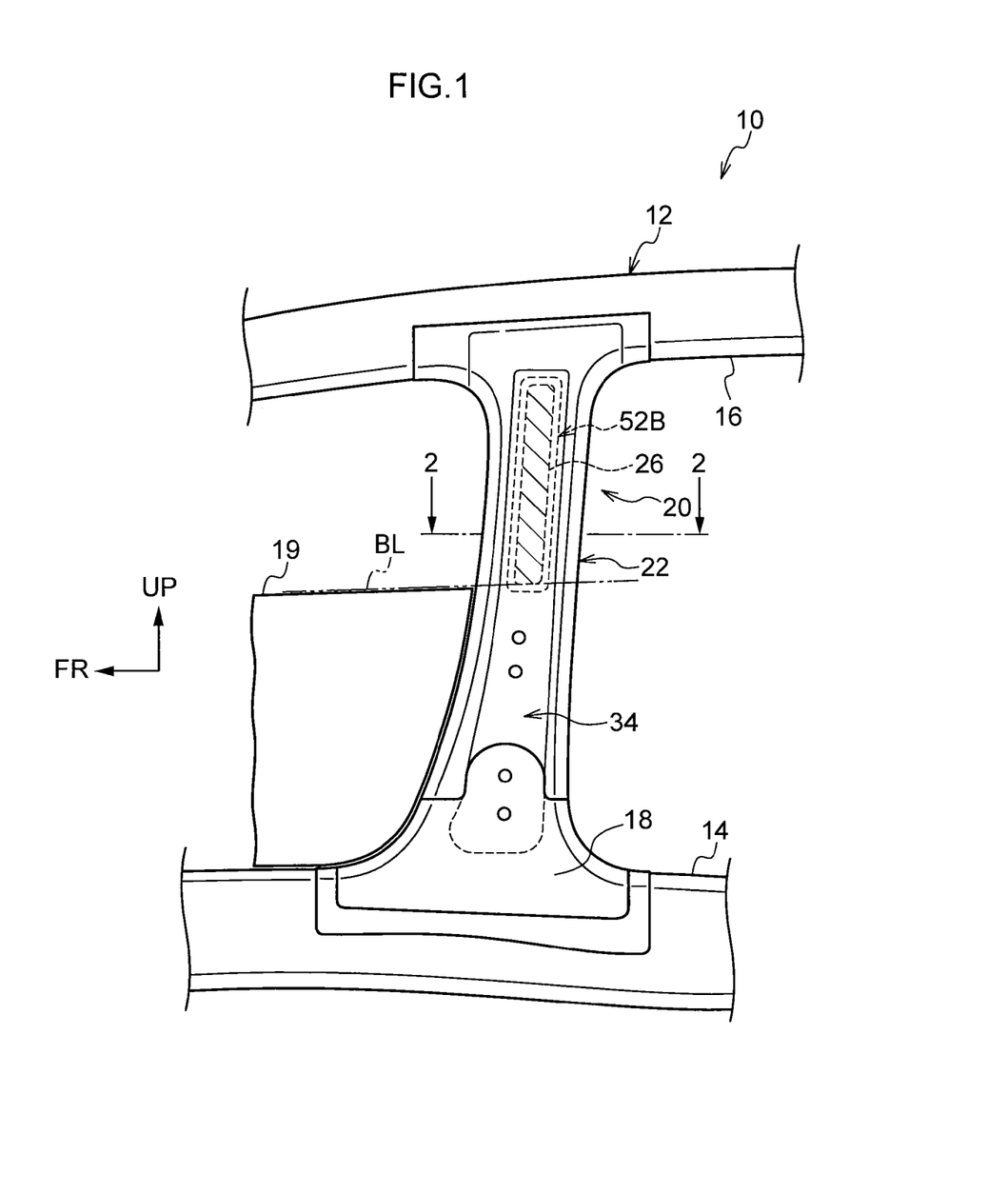
FIG. 1 is a configuration drawing illustrating a center pillar and surrounding portions of the center pillar in a vehicle applied with a vehicle side section structure according to a first exemplary embodiment.
Figure 2:
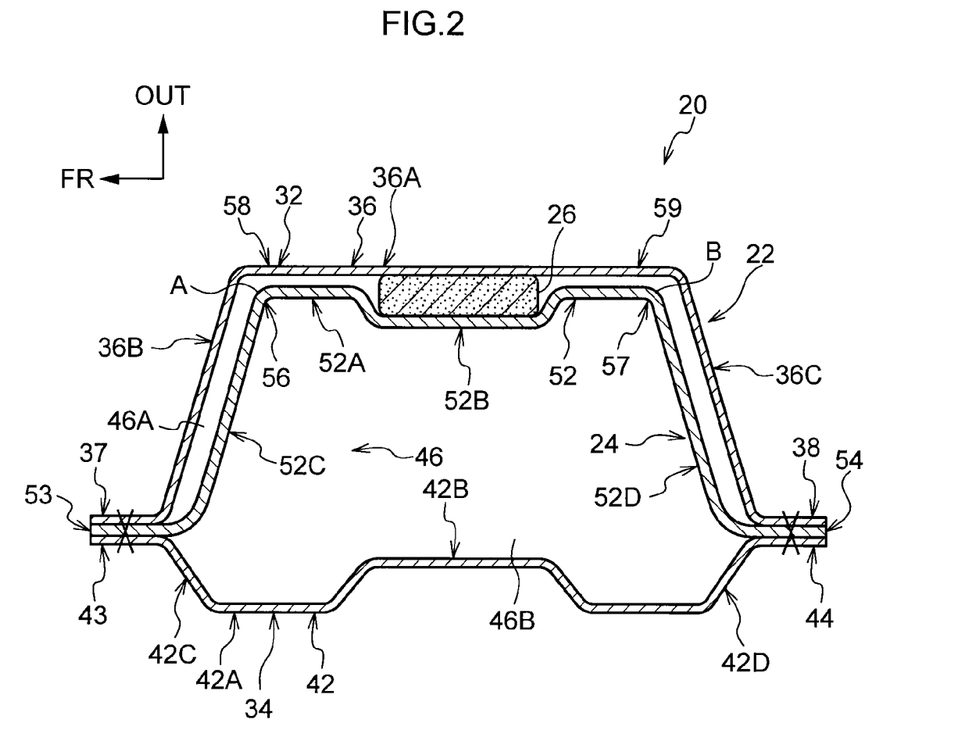
FIG. 2 is a lateral cross-section (a cross-section along 2-2 in FIG. 1) of a vehicle side section structure according to the first exemplary embodiment.
Figure 3:
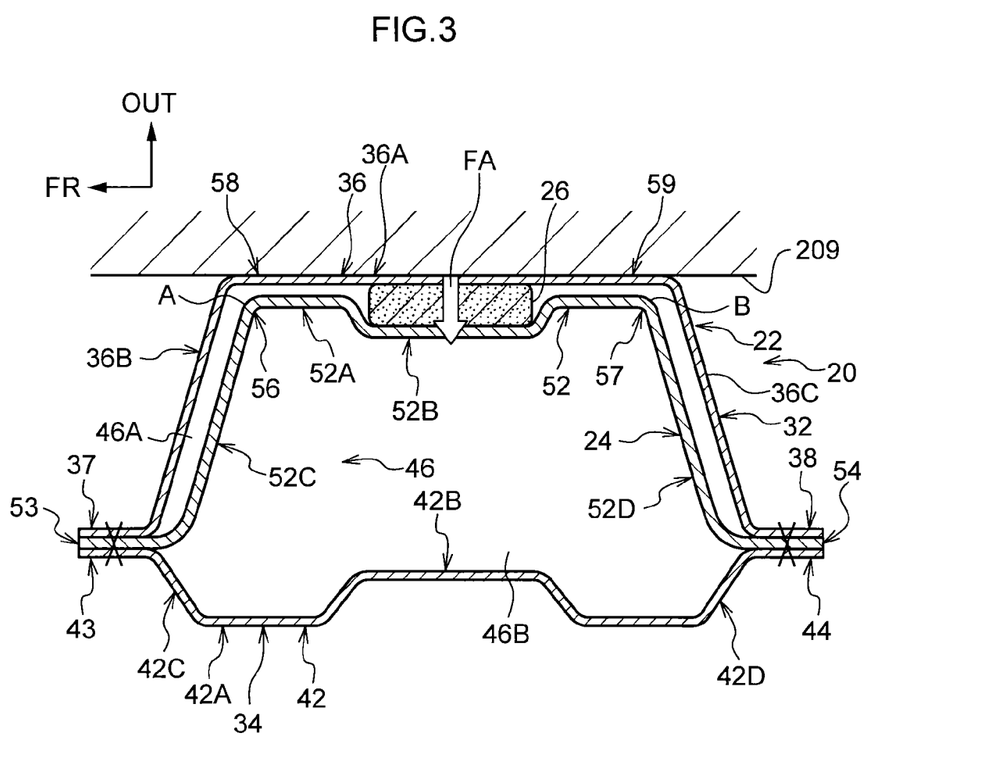
FIG. 3 is an explanatory drawing illustrating a state of a vehicle side section structure according to the first exemplary embodiment when collision load has been input to a center pillar.

Explanation follows regarding a first exemplary embodiment of a vehicle side section structure according to the present invention, with reference to FIG. 1 to FIG. 3. Note that in each of the drawings, the arrow FR indicates the vehicle front (the direction of progress), the arrow UP indicates the vehicle upper side, and the arrow OUT indicates the vehicle width direction outside, as appropriate. In the below explanation, unless specifically stated otherwise, simple reference to the front-rear, up-down, and left-right directions refers to front and rear in the vehicle front-rear direction, up and down in the vehicle up-down direction, and left and right in the vehicle width direction when facing the direction of progress. The × mark in the drawings indicates a spot welded location.

FIG. 1 illustrates part of a vehicle 10. The vehicle 10 includes a vehicle body 12. The vehicle body 12 is configured including rockers 14, roof side rails 16, gussets 18, door panels 19, and vehicle side section structures 20.

Each rocker 14 extends along the vehicle front-rear direction at a vehicle lower section of the vehicle body 12. Each roof side rail 16 extends along the vehicle front-rear direction at a vehicle upper section of the vehicle body 12. Each gusset 18 is provided at the vehicle up-down direction lower side of an inner panel 34, described later, and is joined by welding to the rocker 14 and the inner panel 34.

Each door panel 19 configures a side door, not illustrated in the drawings. FIG. 1 illustrates a part of the door panel 19 at the vehicle front-rear direction front side. A rear side door panel is not illustrated in the drawings. Note that, since the vehicle 10 and the vehicle side section structures 20 are basically configured with left-right symmetry, explanation follows regarding the vehicle side section structure 20 at the right side of the vehicle 10, and explanation regarding the vehicle side section structure 20 at the left side is omitted.

Vehicle Side Section Structure

As illustrated in FIG. 2, the vehicle side section structure 20 includes a center pillar 22 and filler material 26.

Center Pillar

As illustrated in FIG. 1, the center pillar 22 extends along the vehicle up-down direction from the rocker 14 to the roof side rail 16. The center pillar 22 has a vehicle up-down direction lower end portion joined by welding to a vehicle front-rear direction center portion of the rocker 14, and an upper end portion connected by welding to a vehicle front-rear direction center portion of the roof side rail 16. Note that the gusset 18 is incorporated in the center pillar 22.

As illustrated in FIG. 2, the center pillar 22 is configured including an outer panel 32 disposed at the vehicle width direction outside, the inner panel 34 disposed further toward the vehicle width direction inside than the outer panel 32, and a reinforcement panel 24 serving as an example of a reinforcement member. A location of the center pillar 22 that is further to the vehicle up-down direction upper side than a belt line BL (see FIG. 1), described later, has a smaller closed cross-section area than a location at the lower side thereof.

Outer Panel

The outer panel 32 includes a first main body section 36 open toward the vehicle width direction inside, and flange portions 37, 38 jutting out along the vehicle front-rear direction in separate directions to each other from vehicle width direction inside end portions of the first main body section 36. As an example, the outer panel 32 is configured of ordinary sheet steel. As mentioned above, a vehicle up-down direction upper end portion of the outer panel 32 is joined by welding to the roof side rail 16 (see FIG. 1), and a lower end portion of the outer panel 32 is joined by welding to the rocker 14 (see FIG. 1). The outer panel 32 is an example of a facing face.

The first main body section 36 includes a plate shaped base portion 36A running along the vehicle front-rear direction, and a pair of plate shaped upright wall portions 36B, 36C extending along the vehicle width direction toward the inside from respective vehicle front-rear direction end portions of the base portion 36A. Namely, a cross-section profile of the first main body section 36 viewed in the vehicle up-down direction is formed with a hat shape open toward the vehicle width direction inside. In other words, the base portion 36A configures an outside wall of the first main body section 36. The upright wall portion 36B configures a front side wall of the first main body section 36, and the upright wall portion 36C configures a rear side wall of the first main body section 36.

The flange portion 37 is a location jutting out in a plate shape from a vehicle width direction inside end portion of the upright wall portion 36B toward the vehicle front-rear direction front side. The flange portion 38 is a location jutting out in a plate shape from a vehicle width direction inside end portion of the upright wall portion 36C toward the vehicle front-rear direction rear side.

Inner Panel

The inner panel 34 includes a second main body section 42 open toward the vehicle width direction outside, and flange portions 43, 44 jutting out along the vehicle front-rear direction in separate directions to each other from vehicle width direction outside end portions of the second main body section 42. As an example, the inner panel 34 is configured of ordinary sheet steel. As previously mentioned, a vehicle up-down direction upper end portion of the inner panel 34 is joined by welding to the roof side rail 16 (see FIG. 1), and a lower end portion of the inner panel 34 is joined by welding to the gusset 18 (see FIG. 1).

The second main body section 42 includes a plate shaped base portion 42A running along the vehicle front-rear direction, a protruding portion 42B formed in the base portion 42A, and a pair of plate shaped upright wall portions 42C, 42D extending along the vehicle width direction toward the outside from respective vehicle front-rear direction end portions of the base portion 42A. Namely, a cross-section profile of the second main body section 42 viewed in the vehicle up-down direction is formed with a hat shape open toward the vehicle width direction outside. In other words, the base portion 42A configures an inside wall of the second main body section 42. The upright wall portion 42C configures a front side wall of the second main body section 42, and the upright wall portion 42D configures a rear side wall of the second main body section 42. The protruding portion 42B is a location where a vehicle front-rear direction center portion of the base portion 42A projects out toward the vehicle width direction outside. In other words, the protruding portion 42B is a location open toward the vehicle width direction inside.

The flange portion 43 is a location jutting out in a plate shape from a vehicle width direction outside end portion of the upright wall portion 42C toward the vehicle front-rear direction front side. The flange portion 44 is a location jutting out in a plate shape from a vehicle width direction outside end portion of the upright wall portion 42D toward the vehicle front-rear direction rear side.

The length from a vehicle front-rear direction front end of the inner panel 34 to a rear end thereof is substantially the same length as the length from a vehicle front-rear direction front end of the outer panel 32 to a rear end thereof. The flange portions 43, 44 of the inner panel 34 are indirectly joined to the flange portions 37, 38 of the outer panel 32 through flange portions 53, 54 of the reinforcement panel 24, described below, by spot welding from the vehicle width direction inside. A closed cross-section 46 as viewed in the vehicle up-down direction is thereby formed by the outer panel 32 and the inner panel 34.

Reinforcement Panel

The reinforcement panel 24 includes a third main body section 52 serving as an example of a main body section open toward the vehicle width direction inside, a recessed portion 52B, described below, and the flange portions 53, 54 jutting out along the vehicle front-rear direction from vehicle width direction inside end portions of the third main body section 52. As an example, the reinforcement panel 24 is configured of sheet steel that has a higher strength than ordinary sheet steel. The thickness of the reinforcement panel 24 is thicker than the thickness of the outer panel 32 and the thickness of the inner panel 34. A vehicle up-down direction upper end portion of the reinforcement panel 24 is joined by welding to the roof side rail 16 (see FIG. 1) and a lower end portion of the reinforcement panel 24 is joined by welding to the rocker 14 (see FIG. 1). The reinforcement panel 24 is provided inside the closed cross-section 46 and reinforces the outer panel 32.

The third main body section 52 includes a plate shaped base portion 52A running along the vehicle front-rear direction, the recessed portion 52B formed in the base portion 52A, and a pair of plate shaped upright wall portions 52C, 52D extending along the vehicle width direction toward the inside from respective vehicle front-rear direction end portions of the base portion 52A. Namely, a cross-section profile of the third main body section 52 viewed in the vehicle up-down direction is formed with a hat shape open toward the vehicle width direction inside. The base portion 52A is an example of a side wall. The upright wall portion 52C is an example of a front wall, and the upright wall portion 52D is an example of a rear wall.

In the reinforcement panel 24 viewed in the vehicle up-down direction, a boundary portion between the base portion 52A and the upright wall portion 52C is referred to as a front side ridgeline A, and a boundary portion between the base portion 52A and the upright wall portion 52D is referred to as a rear side ridgeline B. In other words, the front side ridgeline A is formed by the upright wall portion 52C and the base portion 52A, and the rear side ridgeline B is formed by the base portion 52A and the upright wall portion 52D. Namely, the third main body section 52 includes the front side ridgeline A and the rear side ridgeline B. The front side ridgeline A and the rear side ridgeline B each extend along the vehicle up-down direction. The front side ridgeline A and the rear side ridgeline B are aligned in the vehicle front-rear direction with a spacing therebetween.

The recessed portion 52B is a location where a vehicle front-rear direction center portion of the base portion 52A is indented toward the vehicle width direction inside. In other words, the recessed portion 52B is a location open toward the vehicle width direction outside. The recessed portion 52B is formed between the front side ridgeline A and the rear side ridgeline B of the base portion 52A in the vehicle front-rear direction. As illustrated in FIG. 1, the recessed portion 52B extends along the vehicle up-down direction from the belt line BL to the roof side rail 16 of the vehicle 10. Note that a line passing through a vehicle up-down direction upper end of the door panel 19 (illustrated by the double-dotted dashed line in FIG. 1) is referred to as "belt line BL".

The roof side rail 16 (see FIG. 1) is formed with a closed cross-section by a roof side rail outer and a roof side rail inner, not illustrated in the drawings, that face each other in the vehicle width direction. Note that, as an example, the third main body section 52 formed with the recessed portion 52B is joined to an outside face of the non-illustrated roof side rail outer from the vehicle width direction outside. However, the third main body section 52 may be inserted between the non-illustrated roof side rail outer and roof side rail inner, and joined thereto in a state clamped therebetween.

As illustrated in FIG. 2, the flange portion 53 is a location jutting out in a plate shape from a vehicle width direction inside end portion of the upright wall portion 52C toward the vehicle front-rear direction front side. The flange portion 54 is a location jutting out in a plate shape from a vehicle width direction inside end portion of the upright wall portion 52D toward the vehicle front-rear direction rear side.

The length from a vehicle front-rear direction front end of the reinforcement panel 24 to a rear end thereof is substantially the same length as the length from the vehicle front-rear direction front end of the outer panel 32 to the rear end thereof. The flange portions 53, 54 of the reinforcement panel 24 are directly joined to the flange portions 37, 38 of the outer panel 32 by spot welding from the vehicle width direction inside. The flange portions 53, 54 are also directly joined to the flange portions 43, 44 of the inner panel 34 by spot welding from the vehicle width direction inside. The closed cross-section 46 previously described is thereby partitioned into a closed cross-section 46A formed by the outer panel 32 and the reinforcement panel 24, and a closed cross-section 46B formed by the reinforcement panel 24 and the inner panel 34.

Note that the location where the front side ridgeline A of the third main body section 52 is formed is referred to as a "formation portion 56" and the location where the rear side ridgeline B is formed is referred to as a "formation portion 57". As an example, when a circle, centered on the front side ridgeline A as viewed in the vehicle up-down direction, is drawn with the distance in the vehicle width direction between the base portion 52A and the base portion 36A as its radius, the formation portion 56 is a location positioned at the inside of this circle. As an example, when a circle, centered on the rear side ridgeline B as viewed in the vehicle up-down direction, is drawn with the distance in the vehicle width direction between the base portion 52A and the base portion 36A as its radius, the formation portion 57 is a location positioned at the inside of this circle.

Projection locations (projection ranges) of the first main body section 36 when the formation portions 56, 57 are projected on the first main body section 36 along the vehicle width direction are referred to as facing portions 58, 59. Namely, in the vehicle width direction, the formation portion 56 and the facing portion 58 face each other, and the formation portion 57 and the facing portion 59 face each other. The "periphery of the front side ridgeline A" includes between the formation portion 56 and the facing portion 58. The "periphery of the rear side ridgeline B" includes between the formation portion 57 and the facing portion 59.

Filler Material

The filler material 26 illustrated in FIG. 2 is configured, as an example, of a thermoset foamed material, and is configured including foamed urethane foam. The filler material 26 is filled inside the closed cross-section 46A between the recessed portion 52B and the outer panel 32 (base portion 36A) that faces the recessed portion 52B in the vehicle width direction, excluding at the periphery of the front side ridgeline A and at the periphery of the rear side ridgeline B. In other words, the filler material 26 is filled inside the closed cross-section 46A excluding between the formation portion 56 and the facing portion 58 and between the formation portion 57 and the facing portion 59.

Specifically, the filler material 26 is foamed (expanded) by heating, so as to contact the recessed portion 52B and the first main body section 36 and to be filled between the recessed portion 52B and the first main body section 36. Note that the filler material 26 does not need to contact the recessed portion 52B and the first main body section 36 prior to being foamed. As illustrated in FIG. 1, as an example, the filler material 26 is filled in the recessed portion 52B from the belt line BL to the roof side rail 16. Note that in the present exemplary embodiment, "filling the recessed portion with filler material" is not limited to "filling up the entire recessed portion with filler material". Namely, "filling the recessed portion with filler material" also includes cases in which part of the recessed portion is exposed after pouring filler material into the recessed portion.

As previously described, in the vehicle side section structure 20 illustrated in FIG. 2, the filler material 26 is not present between the formation portion 56 and the facing portion 58 (the periphery of the front side ridgeline A), or between the formation portion 57 and the facing portion 59 (the periphery of the rear side ridgeline B). Thus, in the vehicle side section structure 20, collision load acting on the outer panel 32 in a side-on collision (hereafter simply referred to as "load") is not directly transferred to the front side ridgeline A or the rear side ridgeline B through the filler material 26.

Comparative Examples

Figure 7A:
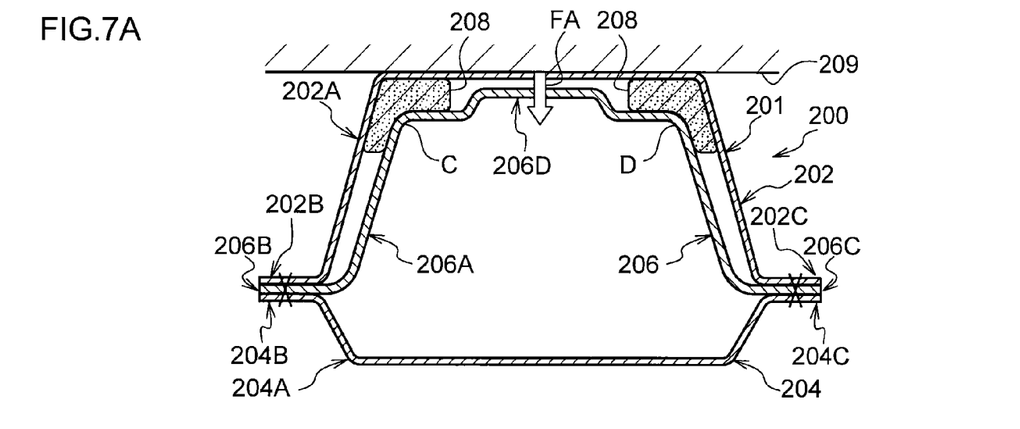
FIG. 7A is an explanatory drawing illustrating a state of a vehicle side section structure of a first comparative example when collision load has been input to a center pillar according to the first comparative example.

FIG. 7A illustrates a vehicle side section structure 200 of a first comparative example to the present exemplary embodiment. The vehicle side section structure 200 includes an outer panel 202, an inner panel 204, a reinforcement panel 206, and filler material 208. A center pillar 201 is formed by the outer panel 202, the inner panel 204, and the reinforcement panel 206.

The outer panel 202 includes a main body section 202A with a hat shaped cross-section open toward the vehicle width direction inside, and flange portions 202B, 202C jutting out toward the vehicle front-rear direction front side and rear side from vehicle width direction inside end portions of the main body section 202A. The inner panel 204 includes a main body section 204A with a hat shaped cross-section open toward the vehicle width direction outside, and flange portions 204B, 204C jutting out toward the vehicle front-rear direction front side and rear side from vehicle width direction outside end portions of the main body section 204A.

The reinforcement panel 206 includes a main body section 206A with a hat shaped cross-section open toward the vehicle width direction inside, and flange portions 206B, 206C jutting out toward the vehicle front-rear direction front side and rear side from vehicle width direction inside end portions of the main body section 206A. A projection portion 206D is formed projecting out toward the vehicle width direction outside at the vehicle front-rear direction center of the main body section 206A. A front side ridgeline C and a rear side ridgeline D are set at the vehicle front-rear direction front side and rear side of the projection portion 206D of the main body section 206A. The flange portions 206B, 206C are joined to the flange portions 202B, 202C by spot welding from the vehicle width direction inside. The flange portions 204B, 204C are joined to the flange portions 206B, 206C by spot welding from the vehicle width direction inside.

The filler material 208 covers the front side ridgeline C and the rear side ridgeline D of the reinforcement panel 206 from the vehicle width direction outside, and is filled between the outer panel 202 and the reinforcement panel 206. Note that, of the space between the outer panel 202 and the reinforcement panel 206, the filler material 208 is not filled in part of the space between the front side ridgeline C and the rear side ridgeline D.

Note that in the vehicle side section structure 200, since the filler material 208 is filled covering the front side ridgeline C and the rear side ridgeline D from the vehicle width direction outside, the reinforcement panel 206 needs to be disposed toward the vehicle width direction inside along the vehicle width direction length of the filler material 208. The cross-section height in the vehicle width direction of the closed cross-section formed by the inner panel 204 and the reinforcement panel 206 is shorter than in configurations that do not include the filler material 208, such that strength is decreased.

In the vehicle side section structure 200, in the event of a side-on collision with a barrier 209 in which a load FA due to the collision has acted on the center pillar 201, due to the cross-section height being short, there is a possibility that the moment (of resistance) at which the front side ridgeline C and the rear side ridgeline D buckle is reduced and strength is decreased. Moreover, in the vehicle side section structure 200, when the load FA is input to the center pillar 201 from the barrier 209, the load is transmitted through the filler material 208 to the locations of the front side ridgeline C and the rear side ridgeline D prior to a vehicle front-rear direction center portion of the reinforcement panel 206. There is accordingly a possibility that the amount of vehicle body deformation in an initial stage of a side-on collision is increased.

Figure 6:
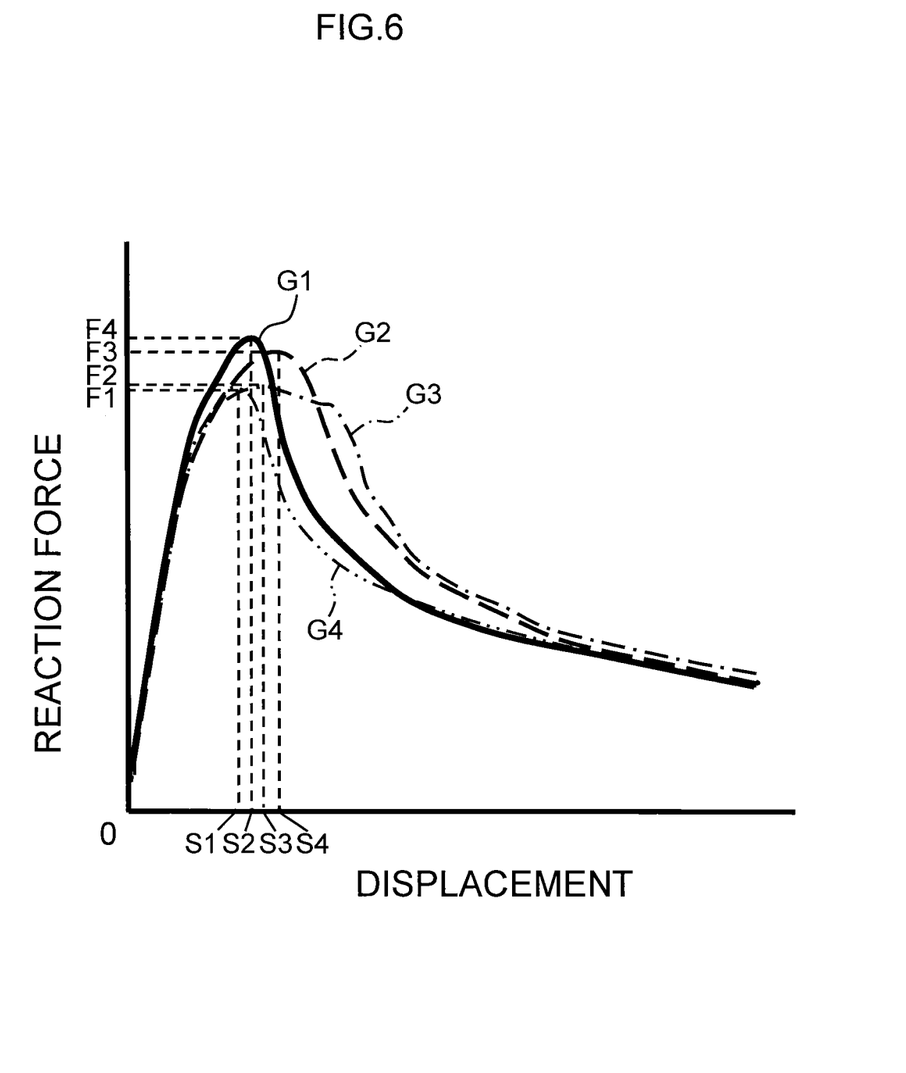
FIG. 6 is a graph illustrating a relationship between reaction force and displacement in a vehicle side section structure according to the first exemplary embodiment, and in vehicle side section structures according to a first comparative example, a second comparative example, and a third comparative example.

A relationship between reaction force of the vehicle side section structure 200 and displacement was graphed using computer aided engineering (CAE) analysis to obtain graph G3 illustrated in FIG. 6. In graph G3, a reaction force F2 occurs at a displacement S3.

Figure 7B:
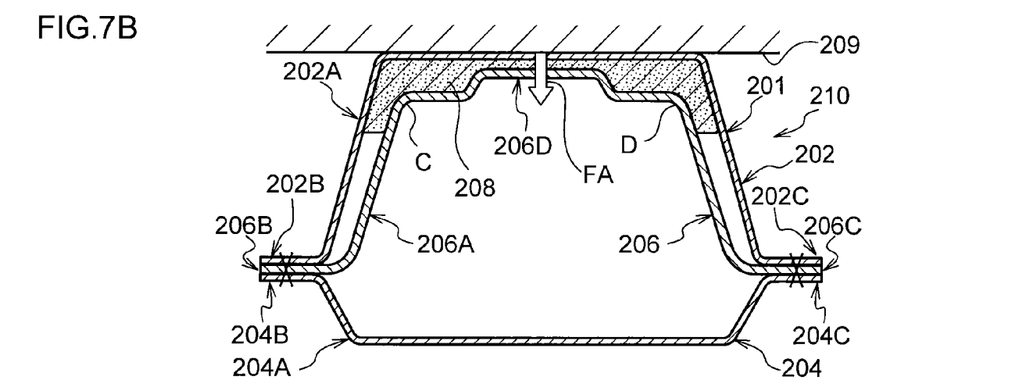
FIG. 7B is an explanatory drawing illustrating a state of a vehicle side section structure of a second comparative example when collision load has been input to a center pillar according to the second comparative example.

FIG. 7B illustrates a vehicle side section structure 210 of a second comparative example. The vehicle side section structure 210 has a configuration in which the filler material 208 is filled covering the main body section 206A from the vehicle width direction outside from the front side ridgeline C to the rear side ridgeline D in the vehicle side section structure 200 (see FIG. 7A). In the vehicle side section structure 210, since the filler material 208 is filled covering the front side ridgeline C and the rear side ridgeline D in a manner similar to that in the vehicle side section structure 200 (see FIG. 7A), the cross-section height of the closed cross-section in the vehicle width direction is shortened, and there is a possibility that strength is decreased. There is also a possibility that the amount of vehicle body deformation in an initial stage of a side-on collision is increased.

A relationship between reaction force of the vehicle side section structure 210 and displacement was graphed using CAE analysis to obtain graph G2 illustrated in FIG. 6. In graph G2, a reaction force F3 (>F2) occurs at a displacement S4 (>S3). Namely, a higher reaction force is obtained in the vehicle side section structure 210 than in the vehicle side section structure 200 (see FIG. 7A).

Figure 7C:
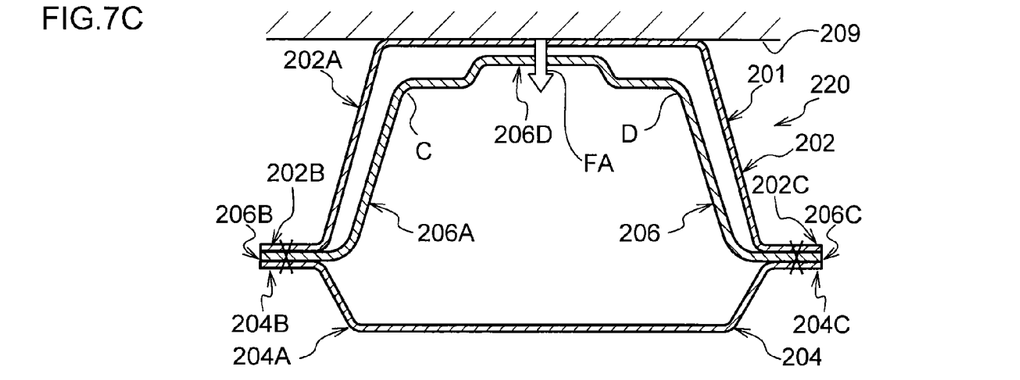
FIG. 7C is an explanatory drawing illustrating a state of a vehicle side section structure of a third comparative example when collision load has been input to a center pillar according to the third comparative example.

FIG. 7C illustrates a vehicle side section structure 220 of a third comparative example. The vehicle side section structure 220 has a configuration in which filler material 208 is not filled in the vehicle side section structure 200 (see FIG. 7A). A relationship between reaction force of the vehicle side section structure 220 and displacement was graphed using CAE analysis to obtain graph G4 illustrated in FIG. 6. In graph G4, a reaction force F1 (<F2) occurs at a displacement S1 (<S3). Namely, a lower reaction force is obtained in the vehicle side section structure 220 than in the vehicle side section structure 200 (see FIG. 7A). This is conceivably because there is no filler material 208.

Operation and Advantageous Effects

Explanation follows regarding operation and advantageous effects of the vehicle side section structure 20 of the first exemplary embodiment.

In the vehicle side section structure 20 illustrated in FIG. 3, the recessed portion 52B is formed in the third main body section 52 (base portion 52A) of the reinforcement panel 24. The strength of the reinforcement panel 24 is thereby higher than in configurations in which the base portion 52A has a straight line shape. The recessed portion 52B has a shape indented toward the vehicle width direction inside of the base portion 52A, thereby enabling the amount of filler material 26 that is filled in the vehicle width direction between the first main body section 36 and the recessed portion 52B to be increased compared to configurations in which a recessed portion is indented toward the vehicle width direction outside.

Note that in the vehicle side section structure 20, in a side-on collision with the barrier 209, the load (collision load) FA toward the vehicle width direction inside acts on the center pillar 22, such that the outer panel 32 enters a compressed state and the inner panel 34 enters a stretched state. Namely, although the outer panel 32 buckles due to compression force, the first main body section 36 of the outer panel 32 is supported from the vehicle width direction inside by the filler material 26, such that the buckling of the outer panel 32 is suppressed compared to configurations in which there is no filler material 26. Suppressing the buckling of the outer panel 32 enables the buckling of the reinforcement panel 24 that is joined to the outer panel 32 to be suppressed.

The filler material 26 is filled between the recessed portion 52B and the first main body section 36, excluding at the periphery of the front side ridgeline A and at the periphery of the rear side ridgeline B of the third main body section 52. This enables the front side ridgeline A and rear side ridgeline B of the reinforcement panel 24 to be disposed further toward the vehicle width direction outside than in configurations in which the filler material 26 is filled at the periphery of the front side ridgeline A and the periphery of the rear side ridgeline B of the third main body section 52. This enables the cross-section height of the closed cross-section 46B formed by the inner panel 34 and the reinforcement panel 24 to be taller, thereby enabling the moment (of resistance) at which the front side ridgeline A and the rear side ridgeline B portions of the reinforcement panel 24 buckle to be increased, and the strength of the vehicle side section structure 20 to be improved. Namely, configurations in which the filler material 26 is employed in the center pillar 22 enable the strength of the center pillar 22 to be improved.

Moreover, since the filler material 26 is not present at the periphery of the front side ridgeline A or at the periphery of the rear side ridgeline B, load is not directly transmitted to the front side ridgeline A or the rear side ridgeline B by the filler material 26 when the load FA has acted. Thus, transmission of load to the reinforcement panel 24 is delayed, and deformation of the reinforcement panel 24 is delayed, until the barrier 209 causes the outer panel 32 to deform and to contact the front side ridgeline A and the rear side ridgeline B of the reinforcement panel 24, thereby enabling the deformation amount of the vehicle body 12 (see FIG. 1) in an initial stage of a side-on collision to be suppressed.

In the vehicle side section structure 20, the load FA acting on the outer panel 32 in a side-on collision is transmitted to the reinforcement panel 24 through the filler material 26 that is in contact with the outer panel 32, and is borne by the reinforcement panel 24. The load FA borne by the outer panel 32 is accordingly less than in configurations which do not include the filler material 26, thereby enabling deformation of the outer panel 32 to be suppressed.

In the vehicle side section structure 20, part of the load FA acting on the outer panel 32 in a side-on collision is transmitted to the reinforcement panel 24 through the filler material 26 at the belt line BL of the vehicle 10 (see FIG. 1), and is borne by the reinforcement panel 24. The remaining load FA acting on the outer panel 32 in a side-on collision is transmitted from the belt line BL to the roof side rail 16 (see FIG. 1) through the filler material 26. Thus the load FA acting on the outer panel 32 in a side-on collision is distributed to, and borne by, the reinforcement panel 24 and the roof side rail 16, and is suppressed from localized concentration at a portion of the reinforcement panel 24, thereby enabling deformation of the reinforcement panel 24 to be suppressed.

The vehicle side section structure 20 is reinforced by filling the filler material 26 at locations of the center pillar 22 that have a small closed cross-section area, thereby enabling deformation of the reinforcement panel 24 and the center pillar 22 to be suppressed.

A relationship between reaction force and displacement of the vehicle side section structure 20 was graphed using CAE analysis to obtain graph G1 illustrated in FIG. 6. In graph G1, a reaction force F4 (>F3) occurs at a displacement S2 (which is larger than the displacement S1, and smaller than the displacement S3). Namely, it was confirmed that the vehicle side section structure 20 obtains a higher reaction force than the vehicle side section structures 200, 210, 220 of the comparative examples (see FIGS. 7A, 7B, 7C).

Second Exemplary Embodiment

Explanation follows regarding a vehicle side section structure 70 according to a second exemplary embodiment.

The vehicle side section structure 70 according to the second exemplary embodiment is provided to the vehicle 10 according to the first exemplary embodiment illustrated in FIG. 1, instead of the vehicle side section structure 20. Note that similar configuration to the first exemplary embodiment is appended with the same reference numerals, and explanation thereof is omitted as appropriate. The concept of similar configuration includes configurations that have similar basic functions, although the length and shape of portions may be different.

Figure 4:
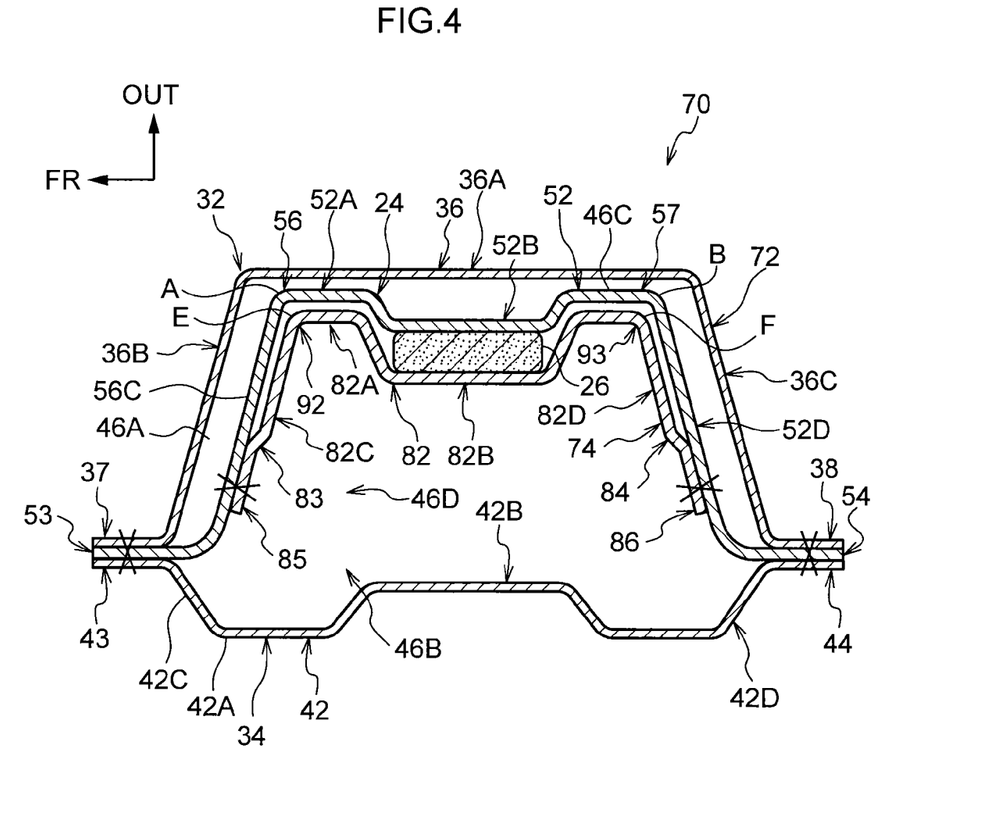
FIG. 4 is a lateral cross-section of a vehicle side section structure according to a second exemplary embodiment.

FIG. 4 illustrates the vehicle side section structure 70. The vehicle side section structure 70 includes a center pillar 72 and filler material 26.

Center Pillar

The center pillar 72 extends along the vehicle up-down direction from the rocker 14 (see FIG. 1) to the roof side rail 16 (see FIG. 1). The center pillar 72 has a vehicle up-down direction lower end portion joined by welding to the vehicle front-rear direction center portion of the rocker 14, and an upper end portion connected by welding to the vehicle front-rear direction center portion of the roof side rail 16. The center pillar 72 is configured including the outer panel 32 disposed at the vehicle width direction outside, the inner panel 34 disposed at the inside thereof, the reinforcement panel 24, and a supplementary reinforcement panel 74 serving as an example of a supplementary reinforcement member and a facing face. A location of the center pillar 72 that is further to the upper side than the belt line BL (see FIG. 1) has a smaller closed cross-section area than a location at the lower side thereof.

The flange portions 37, 38 of the outer panel 32 are superimposed on, and joined to, the flange portions 53, 54 of the reinforcement panel 24 from the vehicle width direction outside. The closed cross-section 46A is formed by the outer panel 32 and the reinforcement panel 24.

Supplementary Reinforcement Panel

The supplementary reinforcement panel 74 includes a fourth main body section 82 open toward the vehicle width direction inside, a recessed portion 82B, described later, and joined portions 85, 86 extending toward the vehicle width direction inside from step portions 83, 84 formed at vehicle width direction inside end portions of the fourth main body section 82. As an example, the supplementary reinforcement panel 74 is configured of sheet steel with a higher strength than ordinary sheet steel. The thickness of the supplementary reinforcement panel 74 is thicker than the thickness of the outer panel 32 and the thickness of the inner panel 34. A vehicle up-down direction upper end portion of the supplementary reinforcement panel 74 is joined by welding to the roof side rail 16 (see FIG. 1) and a lower end portion of the supplementary reinforcement panel 74 is joined by welding to the rocker 14 (see FIG. 1). As an example, the supplementary reinforcement panel 74 reinforces the reinforcement panel 24 from the vehicle width direction inside.

The fourth main body section 82 includes a plate shaped base portion 82A running along the vehicle front-rear direction, the recessed portion 82B formed in the base portion 82A, and a pair of plate shaped upright wall portions 82C, 82D extending along the vehicle width direction toward the inside from respective vehicle front-rear direction end portions of the base portion 82A. Namely, a cross-section profile of the fourth main body section 82 viewed in the vehicle up-down direction is formed with a hat shape open toward the vehicle width direction inside. In other words, the base portion 82A configures an outside wall of the fourth main body section 82. The upright wall portion 82C configures a front side wall of the fourth main body section 82, and the upright wall portion 82D configures a rear side wall of the fourth main body section 82.

In the supplementary reinforcement panel 74 viewed in the vehicle up-down direction, a boundary portion between the base portion 82A and the upright wall portion 82C is referred to as a front side ridgeline E, and a boundary portion between the base portion 82A and the upright wall portion 82D is referred to as a rear side ridgeline F. Namely, the fourth main body section 82 includes the front side ridgeline E and the rear side ridgeline F. The front side ridgeline E and the rear side ridgeline F each extend along the vehicle up-down direction. The front side ridgeline E and the rear side ridgeline F are aligned in the vehicle front-rear direction with a spacing therebetween.

The recessed portion 82B is a location where a vehicle front-rear direction center portion of the base portion 82A is indented toward the vehicle width direction inside. In other words, the recessed portion 82B is a location open toward the vehicle width direction outside between the front side ridgeline E and the rear side ridgeline F. The recessed portion 82B extends along the vehicle up-down direction from the belt line BL to the roof side rail 16 of the vehicle 10 illustrated in FIG. 1.

As illustrated in FIG. 4, the step portion 83 is a location formed in a crank shape at a vehicle width direction inside end portion of the upright wall portion 82C viewed in the vehicle up-down direction, and has a shape in which the vehicle width direction inside is positioned further toward the vehicle front-rear direction front side than the outside. The step portion 84 is a location formed in a crank shape at a vehicle width direction inside end portion of the upright wall portion 82D viewed in the vehicle up-down direction, and has a shape in which the vehicle width direction inside is positioned further toward the vehicle front-rear direction rear side than the outside The joined portion 85 is a plate shaped portion extending from a vehicle width direction inside end portion of the step portion 83 toward the vehicle width direction inside. The joined portion 85 is superimposed on, and joined by spot welding to, the upright wall portion 56C of the reinforcement panel 24 from the vehicle front-rear direction rear side. The joined portion 86 is a plate shaped portion extending from a vehicle width direction inside end portion of the step portion 84 toward the vehicle width direction inside. The joined portion 86 is superimposed on, and joined by spot welding to, the upright wall portion 52D of the reinforcement panel 24 from the vehicle front-rear direction front side.

As previously described, the closed cross-section 46B is formed by the reinforcement panel 24 and the inner panel 34. The closed cross-section 46B is thereby partitioned into a closed cross-section 46C formed by the reinforcement panel 24 and the supplementary reinforcement panel 74, and a closed cross-section 46D formed by the supplementary reinforcement panel 74 and the inner panel 34.

In the second exemplary embodiment, when a circle centered at the front side ridgeline A is drawn with the distance between the base portion 52A and the base portion 82A in the vehicle width direction as its radius, a range positioned at the inside of this circle is included in the "periphery of the front side ridgeline A". When a circle centered at the rear side ridgeline B is drawn with the distance between the base portion 52A and the base portion 82A in the vehicle width direction as its radius, a range positioned at the inside of this circle is included in the "periphery of the rear side ridgeline B".

Projection locations (projection ranges) of the fourth main body section 82 when the formation portions 56, 57 are projected on the fourth main body section 82 along the vehicle width direction are referred to as facing portions 92, 93. Namely, the formation portion 56 and the facing portion 92 face each other, and the formation portion 57 and the facing portion 93 face each other, in the vehicle width direction.

Filler Material

The filler material 26 of the second exemplary embodiment is filled inside the closed cross-section 46C excluding at between the formation portion 56 and the facing portion 92 and at between the formation portion 57 and the facing portion 93. Specifically, the filler material 26 is foamed (expanded) by heating, so as to contact the recessed portion 52B (reinforcement panel 24) and the recessed portion 82B, and to be filled between the recessed portion 52B and the recessed portion 82B. Note that the filler material 26 does not need to contact the recessed portion 52B and the recessed portion 82B prior to being foamed. As an example, the filler material 26 is filled in the recessed portion 82B from the belt line BL (see FIG. 1) to the roof side rail 16 (see FIG. 1).

Thus, the filler material 26 is not present between the formation portion 56 and the facing portion 92, or between the formation portion 57 and the facing portion 93. Thus, in the vehicle side section structure 70, load that has acted on the reinforcement panel 24 in a side-on collision is not directly transferred to the front side ridgeline E or rear side ridgeline F of the supplementary reinforcement panel 74 through the filler material 26.

Operation and Advantageous Effects

Explanation follows regarding operation and advantageous effects of the vehicle side section structure 70 of the second exemplary embodiment.

Figure 5:
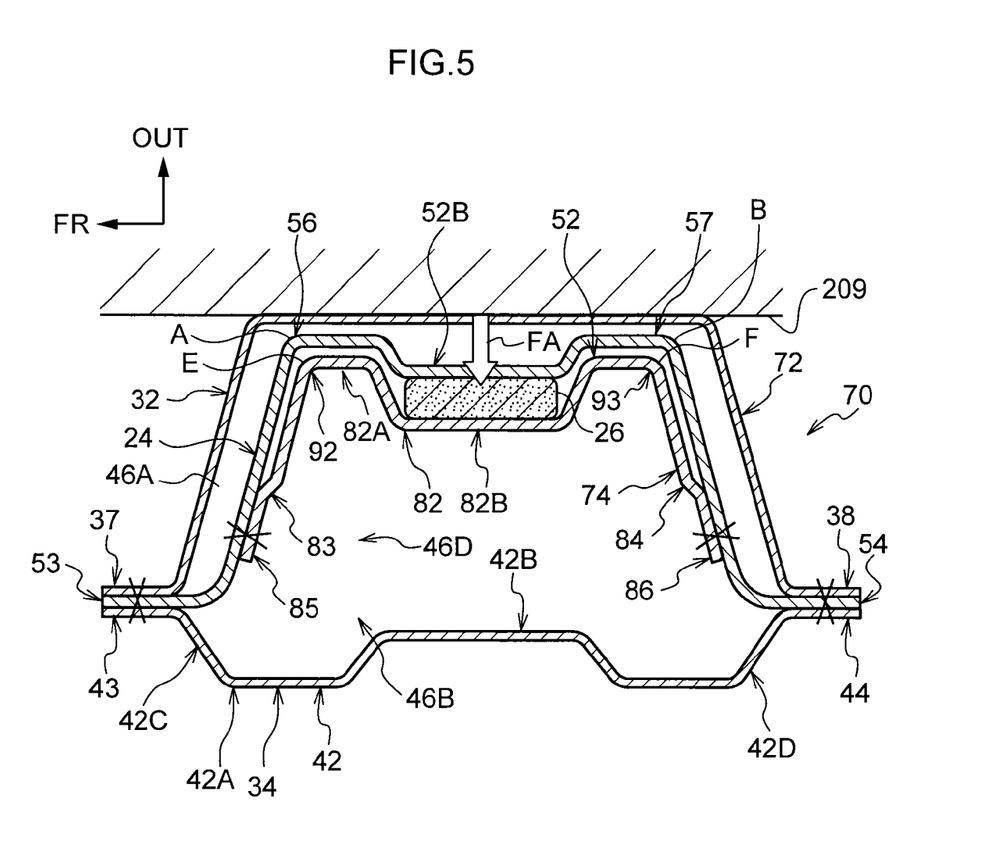
FIG. 5 is an explanatory drawing illustrating a state of a vehicle side section structure according to the second exemplary embodiment when collision load has been input to a center pillar.

In the vehicle side section structure 70 illustrated in FIG. 5, the recessed portion 82B is formed in the fourth main body section 82 (base portion 82A) of the supplementary reinforcement panel 74. The strength of the supplementary reinforcement panel 74 is thereby higher than in configurations in which the base portion 82A has a straight line shape. The recessed portion 82B has a shape indented toward the vehicle width direction inside of the base portion 82A, thereby enabling the amount of filler material 26 filled between the third main body section 52 and the recessed portion 82B to be increased compared to configurations in which a recessed portion is indented toward the vehicle width direction outside.

Note that in the vehicle side section structure 70, in a side-on collision with the barrier 209, the load (collision load) FA toward the vehicle width direction inside acts on the center pillar 72, such that the outer panel 32 enters in a compressed state and the inner panel 34 enters a stretched state. The outer panel 32 thereby buckles due to compression force. Although the buckled outer panel 32 contacts the reinforcement panel 24, the third main body section 52 of the reinforcement panel 24 is supported from the vehicle width direction inside by the filler material 26, such that the buckling of the reinforcement panel 24 is suppressed compared to configurations in which there is no filler material 26. Suppressing the buckling of the reinforcement panel 24 enables the buckling of the supplementary reinforcement panel 74 that is joined to the reinforcement panel 24 to be suppressed.

The filler material 26 is filled between the recessed portion 52B and the recessed portion 82B, excluding at the periphery of the front side ridgeline A and at the periphery of the rear side ridgeline B of the third main body section 52. This enables the front side ridgeline E and rear side ridgeline F of the supplementary reinforcement panel 74 to be disposed further toward the vehicle width direction outside than in configurations in which the filler material 26 is filled at the peripheries of the front side ridgeline A and rear side ridgeline B. This enables the cross-section height of the closed cross-section 46B formed by the inner panel 34 and the supplementary reinforcement panel 74 to be taller, thereby enabling the moment (of resistance) at which the front side ridgeline E and rear side ridgeline F portions buckle to be increased, and the strength of the vehicle side section structure 70 to be improved. Namely, configurations in which the filler material 26 is employed in the center pillar 72 enable the strength of the center pillar 72 to be improved.

Moreover, since the filler material 26 is not present between the front side ridgeline A and the front side ridgeline E, or between the rear side ridgeline B and the rear side ridgeline F, load is not transmitted from the front side ridgeline A to the front side ridgeline E, or from the rear side ridgeline B to the rear side ridgeline F by the filler material 26 when the load FA has acted. Thus, transmission of load to the supplementary reinforcement panel 74 is delayed, and deformation of the supplementary reinforcement panel 74 is delayed, until the barrier 209 causes the outer panel 32 and the reinforcement panel 24 to deform and to contact the front side ridgeline E and rear side ridgeline F of the supplementary reinforcement panel 74. This enables the deformation amount of the vehicle body 12 (see FIG. 1) in an initial stage of a side-on collision to be suppressed.

In the vehicle side section structure 70, the load FA is transmitted from the outer panel 32 to the reinforcement panel 24 due to contact between the outer panel 32 and the reinforcement panel 24 in a side-on collision. The load FA transmitted to the reinforcement panel 24 is borne by the reinforcement panel 24 and transmitted to the supplementary reinforcement panel 74 through the filler material 26 that is in contact with the reinforcement panel 24, and is borne by the supplementary reinforcement panel 74. The load FA is accordingly borne by the reinforcement panel 24 and the supplementary reinforcement panel 74 that are thicker than the outer panel 32, thereby enabling deformation of the center pillar 72 to be suppressed.

In the vehicle side section structure 70, as previously described, part of the load FA acting on the reinforcement panel 24 in a side-on collision is transmitted to the supplementary reinforcement panel 74 through the filler material 26 at the belt line BL of the vehicle 10 (see FIG. 1), and is borne by the supplementary reinforcement panel 74. The remaining load FA acting on the reinforcement panel 24 in a side-on collision is transmitted from the belt line BL to the roof side rail 16 (see FIG. 1) through the filler material 26. Thus the load FA acting on the reinforcement panel 24 in a side-on collision is distributed to, and borne by, the supplementary reinforcement panel 74 and the roof side rail 16, and is suppressed from localized concentration at a portion of the supplementary reinforcement panel 74, thereby enabling deformation of the supplementary reinforcement panel 74 to be suppressed.

In the vehicle side section structure 70, the filler material 26 is filled in at a location of the center pillar 72 that has a small closed cross-section area, thereby enabling deformation of the supplementary reinforcement panel 74 and the center pillar 72 to be suppressed.

Modified Examples

Note that the present invention is not limited to the above exemplary embodiments.

Flange portions may be formed to the supplementary reinforcement panel 74, and the flange portions may be directly joined to the flange portions 53, 54 of the reinforcement panel 24. Another reinforcement panel may be employed in addition to the reinforcement panel 24 and the supplementary reinforcement panel 74. Namely, three or more reinforcement panels may be employed.

The reinforcement panel 24 or the supplementary reinforcement panel 74 is not limited to being directly joined to the rocker 14 or the roof side rail 16, and may be indirectly joined through a gusset or a bracket.

The outer panel 32, the inner panel 34, the reinforcement panel 24, or the supplementary reinforcement panel 74 may be configured of a material other than sheet steel, and may be configured of aluminum or resin, for example. The outer panel 32, the inner panel 34, and the reinforcement panel 24 or the supplementary reinforcement panel 74 may be formed as an integral unit by a means such as extrusion molding.

The filler material 26 is not limited to a foamed material, and may be a material that is not foamed, such as adhesive. The filler material 26 is not limited to only being filled in the recessed portion 52B or the recessed portion 82B. As long as the filler material 26 of the first exemplary embodiment is filled in spaces excluding those between the formation portions 56, 57 and the respective facing portions 58, 59, the filler material 26 may also be filled in spaces outside the recessed portion 52B viewed in the vehicle up-down direction. As long as the filler material 26 of the second exemplary embodiment is filled in spaces excluding those between the formation portions 56, 57 and the respective facing portions 92, 93, the filler material 26 may also be filled in spaces outside the recessed portion 82B viewed in the vehicle up-down direction.

The recessed portion 52B or the recessed portion 82B may be formed further toward the vehicle up-down direction lower side than the belt line BL. The filler material 26 may also be filled in the recessed portion 52B or the recessed portion 82B further toward the vehicle up-down direction lower side than the belt line BL.

The supplementary reinforcement panel 74 may be disposed between the outer panel 32 and the reinforcement panel 24, and superimposed on, and joined to, the reinforcement panel 24 from the vehicle width direction outside.

Vehicle side section structures according to exemplary embodiments and modified examples of the present invention have been explained above; however, these exemplary embodiments and modified examples may be combined and employed as appropriate, and obviously various modifications may be implemented within a range not departing from the spirit of the present invention.

What is claimed is:

1. A vehicle side section structure comprising:
    a center pillar including
        an outer panel that is open toward a vehicle width direction inside,
        an inner panel that is disposed further toward the vehicle width direction inside than the outer panel and forms a closed cross-section with the outer panel, and
        a reinforcement member that is provided inside the closed cross-section, that reinforces the outer panel, and that includes a main body section including a front wall, a side wall, and a rear wall and open toward the vehicle width direction inside, and a recessed portion formed between a front side ridgeline formed by the front wall and the side wall and a rear side ridgeline formed by the side wall and the rear wall and open toward the vehicle width direction outside; and
    filler material that is filled between the recessed portion and a facing face that faces the recessed portion, excluding at the periphery of the front side ridgeline and at the periphery of the rear side ridgeline of the main body section,
    wherein the outer panel includes a front side wall with a first flange portion extending from a vehicle width direction inside end portion thereof toward a vehicle front-rear direction front side, and a rear side wall with a second flange portion extending from a vehicle width direction inside end portion thereof toward a vehicle front-rear direction rear side, wherein the inner panel includes a front side wall with a first flange portion extending from a vehicle width direction inside end portion thereof toward the vehicle front-rear direction front side, and a rear side wall with a second flange portion extending from a vehicle width direction inside end portion thereof toward the vehicle front-rear direction rear side, wherein the reinforcement member includes a first flange portion extending from a vehicle width direction inside end portion of the front wall of the reinforcement member toward a vehicle front-rear direction front side, and a second flange portion extending from a vehicle width direction inside end portion of the rear wall of the reinforcement member toward a vehicle front-rear direction rear side, and wherein the first flange portion of the reinforcement member is directly joined to the first flange portion of the outer panel and the first flange portion of the inner panel, and the second flange portion of the reinforcement member is directly joined to the second flange portion of the outer panel and the second flange portion of the inner panel.

2. The vehicle side section structure of claim 1, wherein the filler material is filled between the outer panel serving as the facing face and the recessed portion.

3. The vehicle side section structure of claim 1, wherein:
a supplementary reinforcement member that reinforces the reinforcement member is provided to the reinforcement member; and
the filler material is filled between the supplementary reinforcement member serving as the facing face and the recessed portion.

4. The vehicle side section structure of claim 1, wherein:
vehicle up-down direction upper end portions of the outer panel, the inner panel, and the reinforcement member are joined to a roof side rail;
the recessed portion extends from a vehicle belt line to the roof side rail; and
the filler material is filled in the recessed portion from the belt line to the roof side rail.

5. The vehicle side section structure of claim 1, wherein the first flange portion of the reinforcement member is sandwiched between the first flange portion of the outer panel and the first flange portion of the inner panel, and the second flange portion of the reinforcement member is sandwiched between the second flange portion of the outer panel and the second flange portion of the inner panel.

6. The vehicle side section structure of claim 1, wherein the front side wall of the outer panel and the front wall of the reinforcement member are parallel, and the rear side wall of the outer panel and the rear wall of the reinforcement member are parallel.

* * * * *